(12) United States Patent
Ueng

(10) Patent No.: US 7,997,232 B2
(45) Date of Patent: Aug. 16, 2011

(54) AQUARIUM

(76) Inventor: Jznn-Pyng Ueng, Makung (TW)

( * ) Notice: Subject to any disclaimer, the term of this patent is extended or adjusted under 35 U.S.C. 154(b) by 42 days.

(21) Appl. No.: 12/266,604

(22) Filed: Nov. 7, 2008

(65) Prior Publication Data

US 2009/0133638 A1      May 28, 2009

(30) Foreign Application Priority Data

Nov. 28, 2007   (TW) .............................. 96145251 A

(51) Int. Cl.
*A01K 63/04* (2006.01)
(52) U.S. Cl. .................................. 119/260; 210/167.23
(58) Field of Classification Search .................. 119/248, 119/259, 260–264, 266; 210/167.21, 167.23–24, 210/416.2
See application file for complete search history.

(56) References Cited

U.S. PATENT DOCUMENTS

| | | | | |
|---|---|---|---|---|
| 3,490,416 A * | 1/1970 | Ott, Jr. et al. | ................. | 119/261 |
| 3,516,544 A * | 6/1970 | Sesholtz | ................... | 210/167.23 |
| 3,720,318 A * | 3/1973 | Cohen | ..................... | 210/167.22 |
| 4,025,431 A * | 5/1977 | Saxton | ........................ | 210/108 |
| 4,033,719 A * | 7/1977 | Conn et al. | .................... | 250/437 |
| 4,414,919 A * | 11/1983 | Hess | .............................. | 119/259 |
| 4,817,561 A * | 4/1989 | Byrne et al. | .................. | 119/260 |
| 4,851,112 A * | 7/1989 | Schlensker | .................... | 210/123 |
| 5,066,394 A * | 11/1991 | Harrison | .................... | 210/167.23 |
| 5,179,911 A * | 1/1993 | Chow et al. | ..................... | 119/264 |
| 5,234,581 A * | 8/1993 | Rosenberg | ..................... | 210/151 |
| 5,317,991 A * | 6/1994 | Lee et al. | ....................... | 119/249 |
| 5,560,318 A * | 10/1996 | Yoshida et al. | ................ | 119/248 |
| 5,628,905 A * | 5/1997 | Montalbano | ................... | 210/615 |
| 6,808,625 B1* | 10/2004 | Wu | ............................ | 210/221.2 |
| 7,631,616 B2* | 12/2009 | Hsieh | ............................ | 119/260 |

FOREIGN PATENT DOCUMENTS

TW            I288607            6/2007

* cited by examiner

*Primary Examiner* — Rob Swiatek
*Assistant Examiner* — Ebony Evans
(74) *Attorney, Agent, or Firm* — Wang Law Firm, Inc.; Li K. Wang

(57) ABSTRACT

An aquarium includes: a box having an accommodating space therein; a dividing board disposed in the accommodating space of the box to divide it into a cultivating layer and a nitrobacteria layer; a pump for drawing water and air, mixing them into bubbles, and sending the mixture out via a transporting pipe; a foam remover connected with the transporting pipe and having a foam outlet and a water outlet. The bubbles received from the transporting pipe are broken into smaller bubbles in the foam remover. The protein impurities in the water are expelled with the bubbles via the foam outlet. The processed water flows via the water outlet into the nitrobacteria layer to decompose the proteins.

6 Claims, 5 Drawing Sheets

AQUARIUM

BACKGROUND OF THE INVENTION

1. Field of Invention

The invention relates to an aquarium and, in particular, to the structure of an aquarium.

2. Related Art

A conventional aquarium, as shown in FIG. 4, has a filter 8 above the opening of its cultivating tank 7. The filter 8 has a water inlet pipe 81 and a water outlet pipe 82. When the filter 8 operates, the water inlet pipe 81 draws water in the cultivating tank 7 into the filter 8 for filtering. The filtered water is sent via the water outlet pipe 81 back into the cultivating tank 7. Such a cyclic operation achieves the goal of filtering the water.

However, the above-mentioned filtering method for the conventional aquarium mainly filters the water above the sand layer 84 of the cultivating tank 7. Since no water flows through the sand layer 84, it is impossible to filter water in the sand layer 84. Moreover, after the sand layer 84 of the cultivating tank 7 is used for some time, it is accumulated with a huge amount of pollutants such as animal excretions and residual food. They will produce extra poisonous ammonia or nitrous acid. It will deteriorate the water and endanger the animal's health.

Please refer to FIG. 5. It shows the structure of an aquarium 9 proposed by the inventor to solve the filtering problem in the prior art. It has been granted with ROC Pat. No. I288607. The top of the cultivating tank 9 is disposed with a water outlet 91. A dividing board 92 is disposed in the cultivating tank 9 so that the cultivating tank 9 is divided into a first accommodating tank 93 and a second accommodating tank 94. A water inlet pipe 95 draws clean water from an external source into the first accommodating tank 93 of the cultivating tank 9. In this case, the water from the external source flows from the first accommodating tank 93 into the sand layer 97 in the second accommodating tank 94 via the through holes 96 on the dividing board 92. Such a water current brings the impurities in the sand layer 97 toward the second accommodating tank 94 of the cultivating tank 9. Finally, the water leaves from the water outlet pipe 91 at the top of the cultivating tank 9. As a result, the excretions or impurities in the sand layer 97 can be washed out of the cultivating tank 9 by the current instead of accumulating therein. Moreover, when it is used in large aquaria or tanks, the water quality can be kept so stable that animals therein have a higher survival rate. Nevertheless, small aquaria have less water. Even after filtering, the water quality is still unstable. Therefore, how to effectively remove or decompose animal's excretions or residual food to ensure the water quality is the goal of the invention.

SUMMARY OF THE INVENTION

An objective of the invention is to provide an aquarium that can effectively remove and decompose organic materials (fish excretions, residual food, and proteins) in water, keeping the water fresh and clean.

Another objective of the invention is to provide an aquarium with better efficiency in decomposing proteins.

To achieve the above-mentioned objectives, the disclosed aquarium includes: a box having an accommodating space therein; a dividing board whose surface has a plurality of through holes and which is disposed in the accommodating space of the box to divide it into a cultivating layer and a nitrobacteria layer, the nitrobacteria layer being disposed with a plurality of bacteria filter balls; a pump for drawing water in the cultivating layer and air outside the box, mixing them into bubbles, and sending the mixture out via a transporting pipe; and a foam remover connected with the transporting pipe and having a foam outlet and a water outlet; wherein the bubbles received from the transporting pipe is broken into smaller bubbles in the foam remover; the protein impurities in the water are expelled with the bubbles via the foam outlet; and the processed water flows via the water outlet into the nitrobacteria layer to decompose the proteins.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
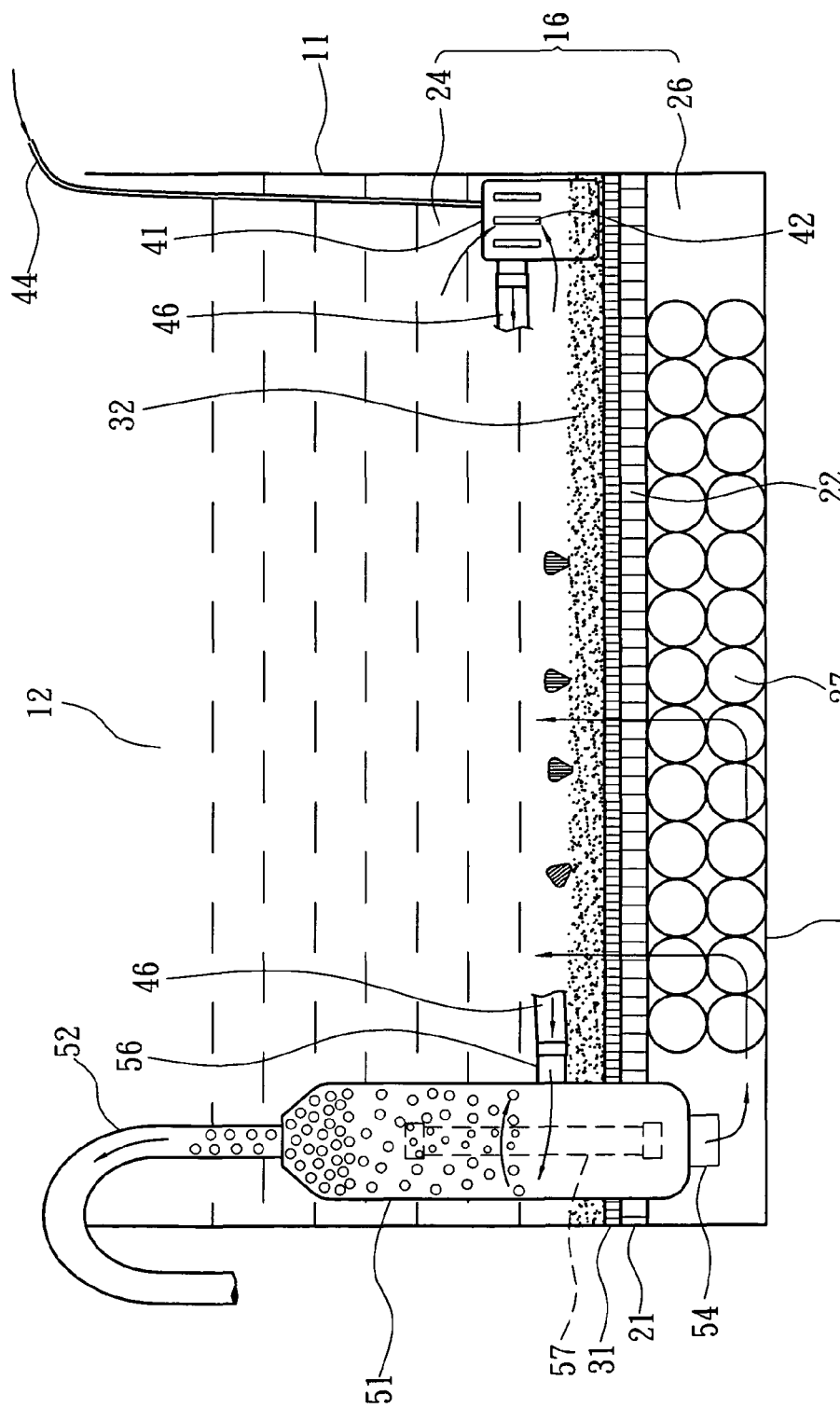
FIG. 1 is a schematic view of the composition of the first embodiment.

Please refer to FIG. 1 for an embodiment of the disclosed aquarium. It mainly comprises a box 11, a dividing board 21, a sand-blocking mesh 31, a pump 41, and a foam remover 51.

The box 11 has an opening 12 and a bottom 14 opposite to the opening 12. The box 11 has an accommodating space 16 therein for holding water. The accommodating space 16 uses the opening to connect to the external space.

The dividing board 21 has a plurality of through holes 22 on its surface. It is disposed in the accommodating space 1 of the box 11, adjacent to the bottom 14, dividing the accommodating space 16 into a cultivating layer 24 and a nitrobacteria layer 26. The cultivating layer 24 allows its user to breed aquarium animals. The nitrobacteria layer 26 is provided with a plurality of bacteria filter balls 27 to perform a nitrobacteria reaction for decomposing the protein impurities in the layer.

The sand-blocking mesh 31 is disposed in the cultivating layer 24 on the surface of the dividing board 21. A sand layer 32 is put on the sand-blocking mesh 31 to prevent sands in the sand layer 32 from falling into the nitrobacteria layer 26 through the through holes 22 of the dividing board 21.

The pump 41 has a plurality of water inlets 42 and an air inlet pipe 44 connecting to the exterior. It draws water in the cultivating layer 24 through the water inlets 42 and air outside box 11 via the air inlet pipe 44. The water and the air thus drawn are mixed into bubbles, which are then sent out via a transporting pipe 46.

The foam remover 51 is disposed in the accommodating space 16 of the box 11. The foam remover 51 has a foam outlet 51, a water outlet 54, and a receiver opening 56. The foam outlet 52 is connected to the outside of the box 11. The water outlet 54 is connected with the nitrobacteria layer 26. The foam remover 56 is connected with one end of the transporting pipe 46 to receive bubbles sent from the pump 41. The bubbles pressurized by the pump 41 rush through the transporting pipe 46 and hit the wall of the foam remover 51, breaking into smaller bubbles thereon. Protein impurities in water are moved with the bubbles out of the box 11 via the foam outlet 52. The processed water flows via the water outlet 54 into the nitrobacteria layer 26. The bacteria filter balls 27 in the nitrobacteria layer 26 perform a nitrobacteria reaction to decompose the protein impurities in the water. Afterwards, the water flows via the through holes 22 of the dividing board 21 back into the cultivating layer 24 of the box 11.

It should be noted that an ultraviolet (UV) lamp 57 can be installed inside the foam remover 51. The purpose of the UV lamp 57 is to kill the bacteria adhered on the bubbles in the foam remover 51. The invention thus has the function of killing bacteria.

According to the above-mentioned structure, the invention first removes protein impurities in water using the foam remover 51. Afterwards, the nitrobacteria layer 26 decomposes protein impurities. Through such double removal and decomposition of protein impurities, the disclosed aquarium makes water therein fresh and clean.

Since the water current processed by the foam remover 51 produces a lot of bubbles due to impacts, more oxygen can be dissolved in water. When the water returns to the nitrobacteria layer 26, the high oxygen level greatly activates the nitrobacteria in the nitrobacteria layer 26, promoting its efficiency in decomposing protein impurities.

Figure 2:
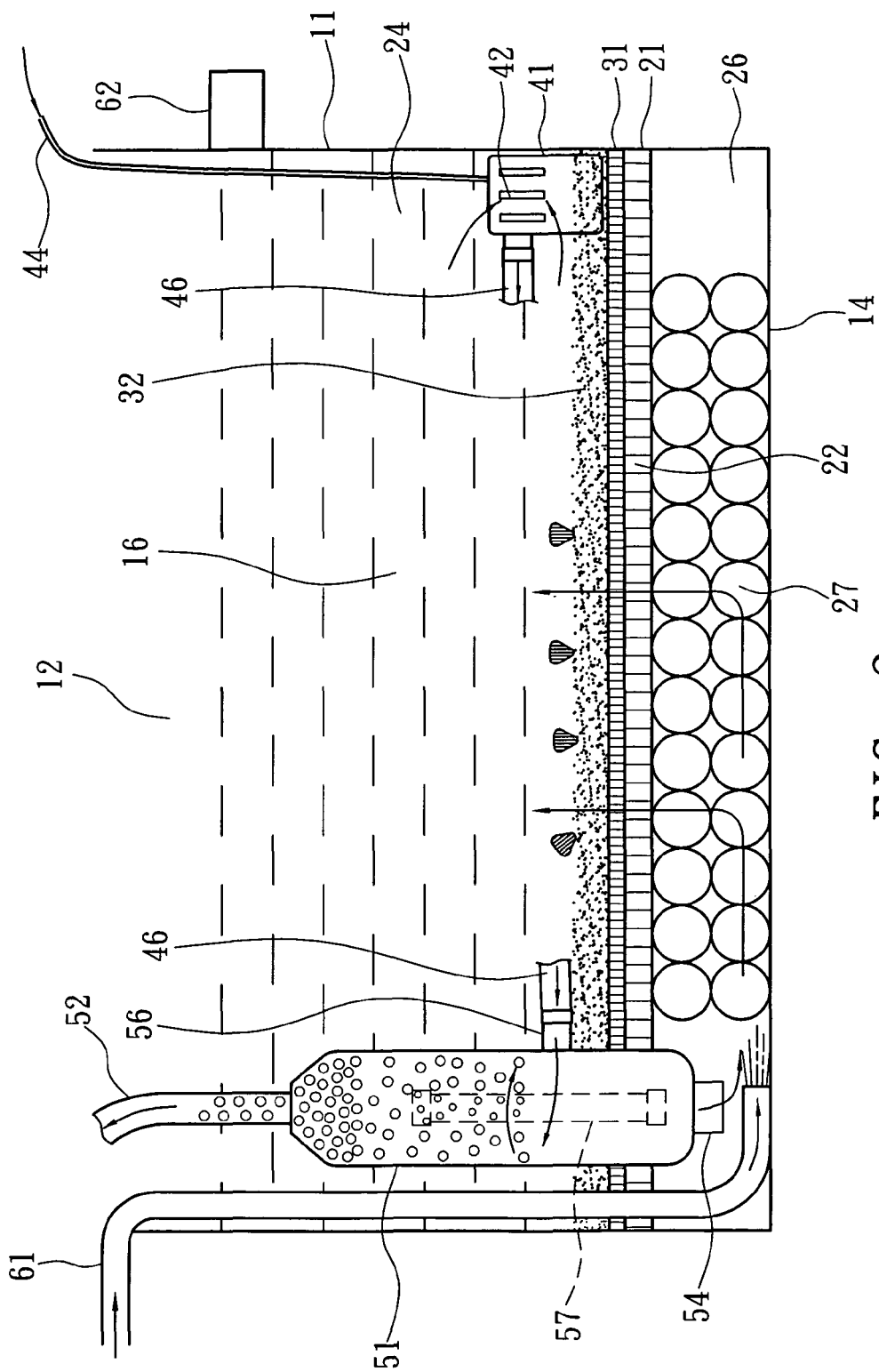
FIG. 2 is a schematic view of the composition of the second embodiment.

Please refer to FIG. 2 for a second embodiment of the invention. A water inlet pipe 61 extends into the nitrobacteria layer 26 in the box 11. An outlet pipe 62 is disposed near the opening 12 of the box 11. The water inlet pipe 61 continuously injects water from an external source into the nitrobacteria layer 26 of the box 11. The water injected by the water inlet pipe 61 is processed by the nitrobacteria in the nitrobacteria layer 26. Afterwards, the water is injected into the cultivating layer 24 via the through holes 22 of the dividing board 21. Such an opening design makes excess or dirty water flow out of the outlet pipe 62 of the box. Therefore, the box 11 of the invention always has fresh water flowing in.

Figure 3:
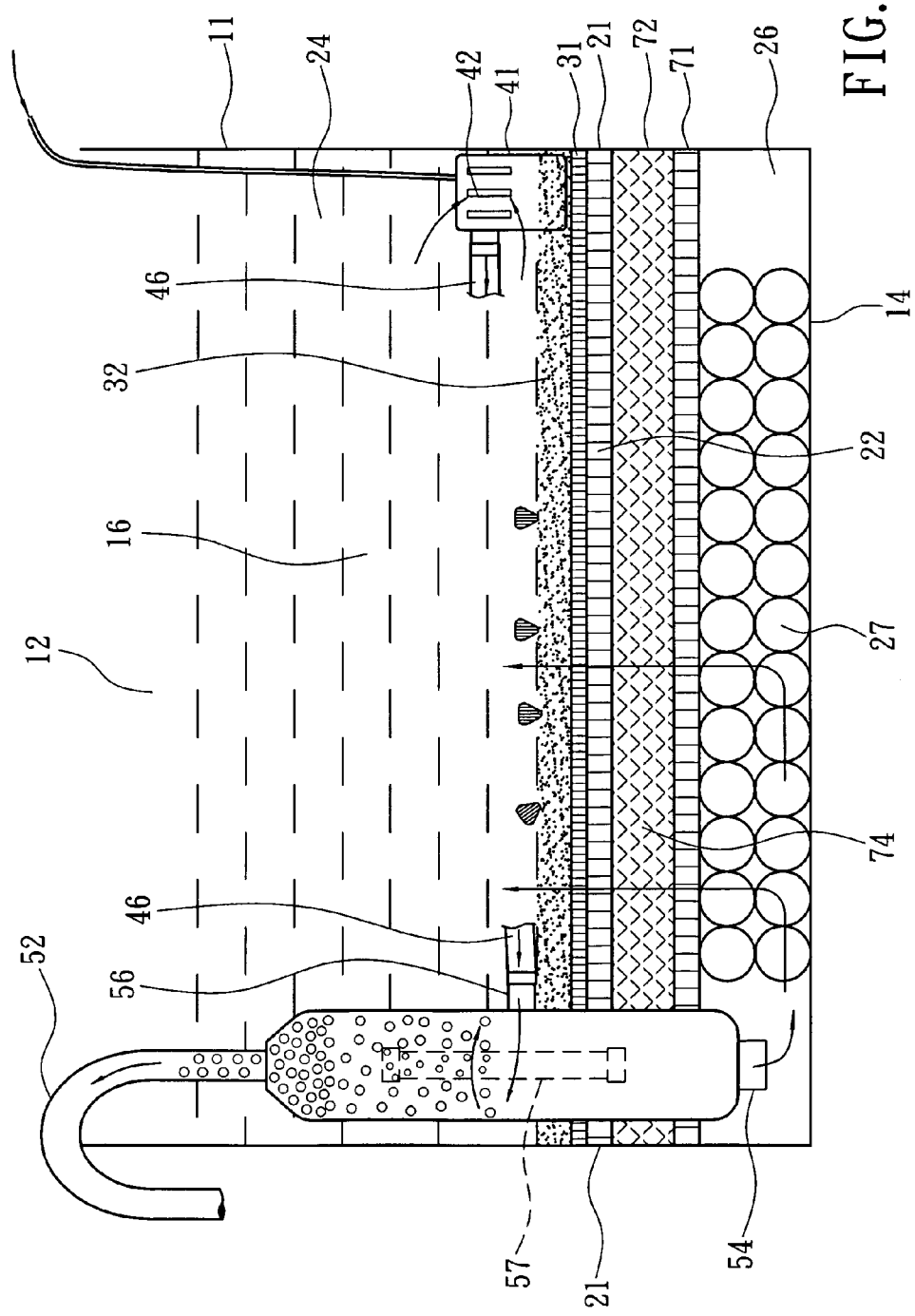
FIG. 3 is a schematic view of the composition of the third embodiment.
Figure 4:
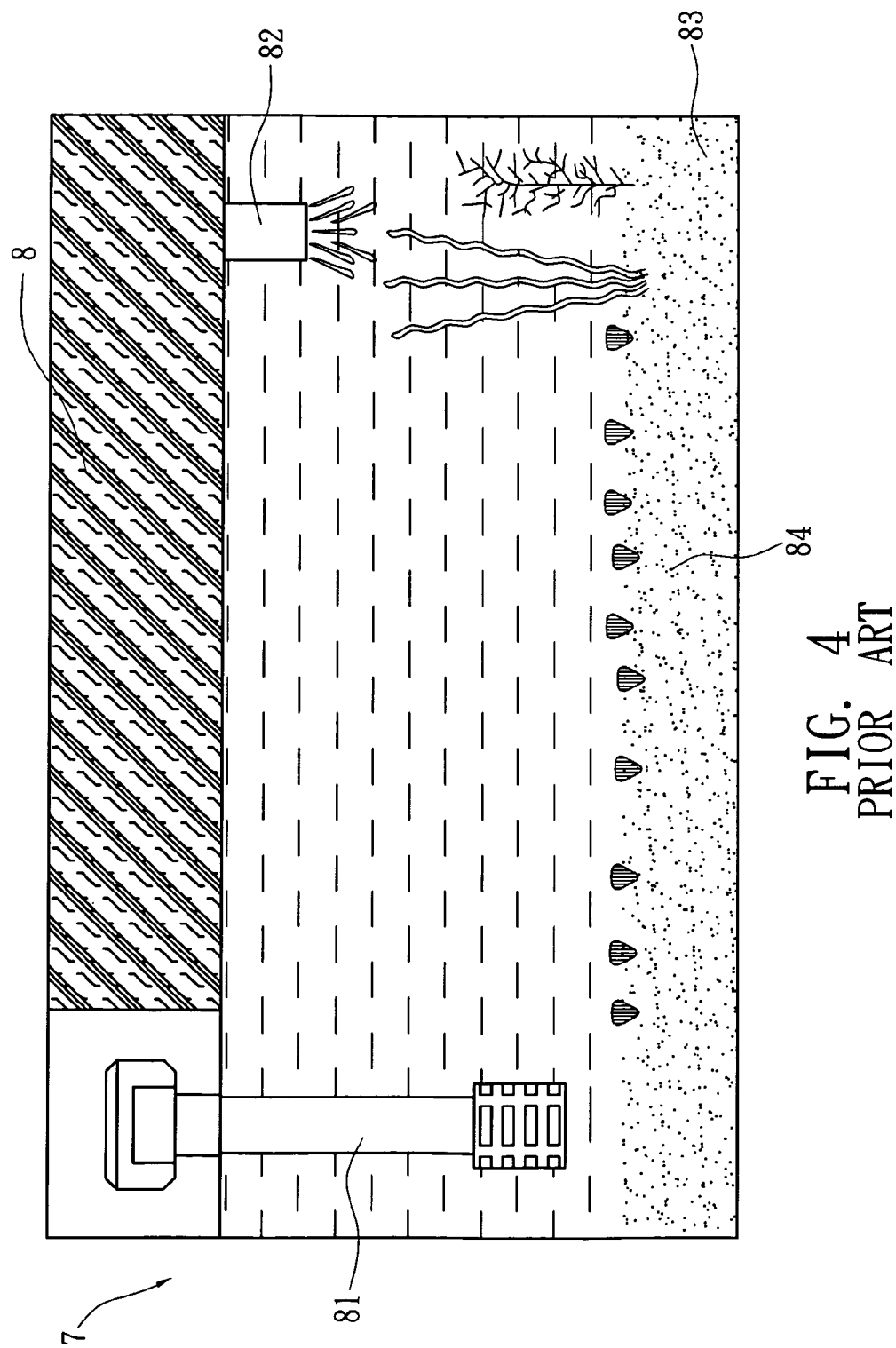
FIG. 4 shows the composition of a conventional aquarium.
Figure 5:
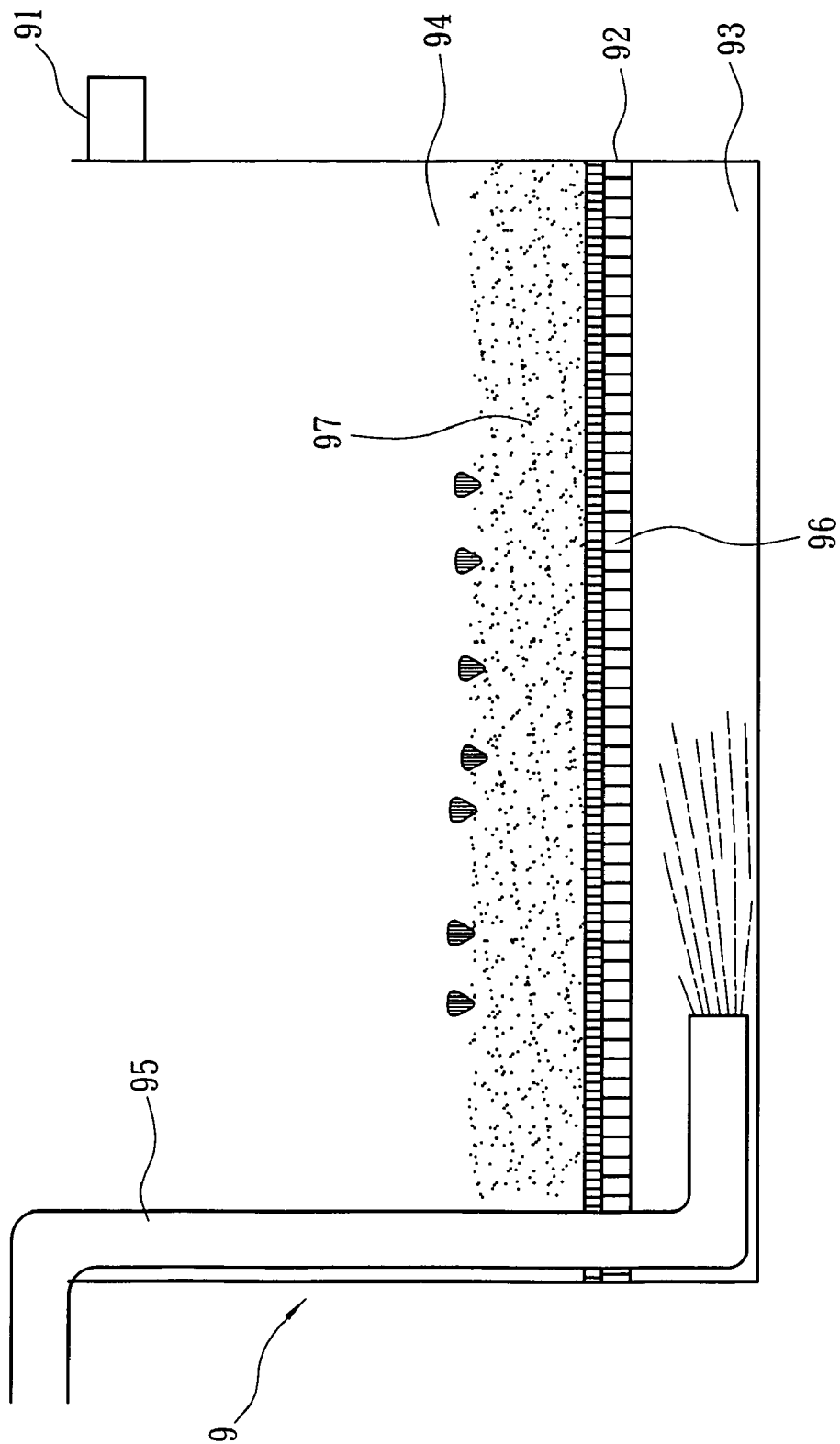
FIG. 5 is a schematic view of the aquarium structure disclosed in ROC Pat. No. I288607.

Please refer to FIG. 3 for a third embodiment of the invention. A second dividing board 71 is disposed between the dividing board 21 and the nitrobacteria layer 26, so that the second dividing board 71 and the dividing board 21 form a filter layer 72 filled with several filtering materials 74. After the water goes through the first part of protein impurity removal and the second part of protein decomposition, it further flows through the filter layer 72 for another filtering. It is obvious that according to practical needs, more dividing boards can be disposed to make more filtering or bacteria killing spaces. Therefore, designs with only one or several dividing boards all fall within the scope of the invention.

The above-mentioned embodiments are used to explain the invention, instead of limiting its scope. Various modifications of the disclosed embodiments in shape or equivalent elements will be apparent to people skilled in the art.

From the above description, it is clear that the invention can effectively remove and decompose organic materials (fish excretions, residual food, and proteins) to keep the water fresh and clean. Moreover, its protein decomposition rate is higher than the prior art.

What is claimed is:

1. An aquarium, comprising:
a box having an opening and accommodating space therein;
a dividing board disposed in the accommodating space of the box to divide the accommodating space into a cultivating layer and a nitrobacteria layer, the nitrobacteria layer being disposed with a plurality of bacteria filter balls;
an immersed pump disposed inside the accommodating space for drawing water in the cultivating layer and air outside the box, mixing them into bubbles, and sending the mixture out via a transporting pipe; and
an immersed foam remover disposed inside the accommodating space and connected with the transporting pipe and having a foam outlet and a water outlet;
wherein a water inlet pipe is disposed in the nitrobacteria layer of the box for injecting water from a source into the nitrobacteria layer and an outlet pipe is disposed near the opening of the box for the excess water in the box to flow out; and
wherein the bubbles received from the transporting pipe is broken into smaller bubbles in the foam remover; protein impurities in the water are expelled with the bubbles via the foam outlet; and the processed water flows via the water outlet into the nitrobacteria layer to decompose the proteins.

2. The aquarium of claim 1, wherein the surface of the dividing board is provided with a sand-blocking mesh and a sand layer is laid thereon, the sand-blocking mesh preventing the sands in the sand layer from falling into the nitrobacteria layer.

3. The aquarium of claim 1, wherein the pump has a plurality of water inlets to suck the water of the cultivating layer and an air inlet pipe connecting to the exterior to suck air in.

4. The aquarium of claim 1, wherein the foam remover is disposed with an ultraviolet lamp.

5. The aquarium of claim 1, wherein the foam remover further has a receiver opening connected with one end of the transporting pipe to receive bubbles from the pump.

6. The aquarium of claim 1, wherein at least a second dividing board is disposed between the dividing board and the nitrobacteria layer so that the second dividing board and the dividing board form a filtering layer filled with some filtering materials.

* * * * *